United States Patent
Kuang

(10) Patent No.: US 9,232,606 B2
(45) Date of Patent: Jan. 5, 2016

(54) SWITCH-MODE POWER SUPPLY, CONTROL CIRCUIT AND ASSOCIATED DIMMING METHOD

(71) Applicant: Naixing Kuang, Hangzhou (CN)

(72) Inventor: Naixing Kuang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 577 days.

(21) Appl. No.: 13/683,904

(22) Filed: Nov. 21, 2012

(65) Prior Publication Data

US 2013/0134894 A1    May 30, 2013

(30) Foreign Application Priority Data

Nov. 25, 2011 (CN) .......................... 2011 1 0380411

(51) Int. Cl.
H05B 37/02 (2006.01)
H05B 33/08 (2006.01)

(52) U.S. Cl.
CPC ............ *H05B 37/02* (2013.01); *H05B 33/0815* (2013.01); *H05B 33/0848* (2013.01); *Y02B 20/346* (2013.01)

(58) Field of Classification Search
CPC .... H05B 37/02; H05B 33/08; H05B 33/0815; H05B 33/0824; H05B 33/0848; H05B 33/0851; H05B 33/0842

USPC ....... 315/185 R, 186, 224, 291, 297, 307, 308
See application file for complete search history.

(56) References Cited

U.S. PATENT DOCUMENTS

| 8,269,423 | B2 | 9/2012 | Yao | |
| 2010/0165683 | A1* | 7/2010 | Sugawara | 363/126 |
| 2011/0234122 | A1 | 9/2011 | Yu | |
| 2011/0285301 | A1* | 11/2011 | Kuang et al. | 315/200 R |
| 2012/0049761 | A1 | 3/2012 | Yu | |
| 2012/0194078 | A1 | 8/2012 | Ren | |
| 2013/0241440 | A1* | 9/2013 | Gaknoki et al. | 315/297 |

* cited by examiner

*Primary Examiner* — Thai Pham
(74) *Attorney, Agent, or Firm* — Perkins Coie LLP

(57) ABSTRACT

A switch-mode power supply and associated control circuit for a light-emitting device are disclosed. The switch-mode power supply having a first switch which is turned ON or OFF by a control signal. The control circuit having an error amplifier, a minimum-off time control circuit and a logic circuit, wherein the error amplifier is configured to provide a compensation signal based on a dimming signal and a feedback signal. The minimum-off time control circuit is configured to provide a minimum-off time control signal to adjust a minimum-off time period of the first switch based on the compensation signal. The logic circuit is configured to provide the control signal based on the minimum-off time control signal.

20 Claims, 8 Drawing Sheets

SWITCH-MODE POWER SUPPLY, CONTROL CIRCUIT AND ASSOCIATED DIMMING METHOD

CROSS-REFERENCE TO RELATED APPLICATION(S)

This application claims the benefit of CN application No. 201110380411.4, filed on Nov. 25, 2011, and incorporated herein by reference.

TECHNICAL FIELD

This invention relates generally to electrical circuits, and more particularly but no exclusively to switch-mode power supply.

BACKGROUND

Recently, light-emitting diode (LED) is widely used in various lighting places per their advantages on good luminance performance, long lifetime and so on. However, LED dimming is needed in different applications.

SUMMARY

It is one of the objects of the present disclosure to provide a switch-mode power supply, control circuit and associated dimming method.

In one embodiment, a control circuit for a switch-mode power supply (SMPS) is disclosed. The switch-mode power supply may comprise a first switch, wherein the first switch is turned ON or OFF via a control signal provided by the control circuit. The control circuit may comprise an error amplifier, a minimum-off time control circuit and a logic circuit, wherein the error amplifier is configured to provide a compensation signal based on a dimming signal and a feedback signal, wherein the minimum-off time control circuit is configured to receive the compensation signal, and to provide a minimum-off time control signal to adjust a minimum-off time period based on the compensation signal when the compensation signal is less than a first threshold signal, and wherein the logic circuit is configured to receive the minimum-off time control signal and to provide the control signal.

In one embodiment, a dimming method for a switch-mode power supply is disclosed. The switch-mode power supply may comprise a first switch, wherein the first switch is turned ON or OFF via a control signal provided by a control circuit. The dimming method may comprise receiving a dimming signal and a feedback signal; providing a compensation signal based on the dimming signal and the feedback signal; adjusting a minimum-off time period of the first switch based on the compensation signal when the compensation signal is less than a first threshold signal; and providing a control signal based on the minimum-off time control signal.

In one embodiment, a switch-mode power supply for driving a light-emitting device is disclosed, wherein the switch-mode power supply may comprise the control circuit described above.

In one embodiment, accurate current regulation for uniform illumination may be achieved via adjusting the minimum-off time period based on the compensation signal when the compensation signal is less than the first threshold signal.

BRIEF DESCRIPTION OF THE DRAWINGS

For a better understanding of the aforementioned embodiments of the invention as well as additional embodiments thereof, reference should be made to the description of embodiments below, in conjunction with the following drawings.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Several embodiments of the present invention are described below. As used hereinafter, the term "couple" generally refers to multiple ways including a direct connection with an electrical conductor and an indirect connection through intermediate diodes, resistors, capacitors, and/or other intermediaries.

Figure 1:
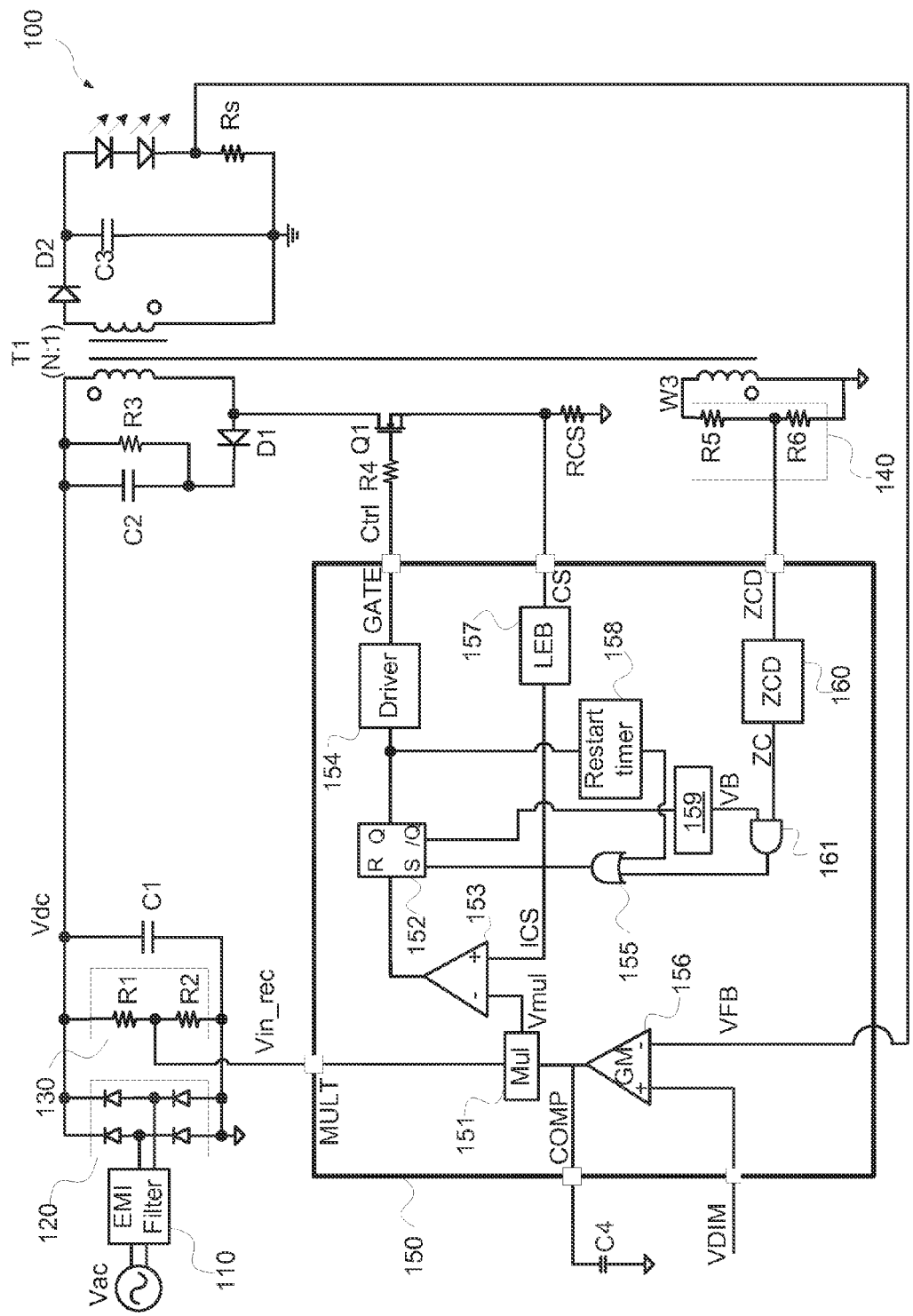
FIG. 1 illustrates a block diagram of a switch-mode power supply in accordance with an embodiment of the present invention.

FIG. 1 shows a block diagram of a LED driving circuit 100 in accordance with an embodiment of the present invention. LED driving circuit 100 employs high power factor flyback converter as an example.

As shown in FIG. 1, an input alternating current (AC) signal Vac is coupled to a bridge rectifier 120 via an EMI filter 110, and a rectified input signal Vdc provided by bridge rectifier 120 is coupled to a primary winding of a transformer T1. A switch Q1 is coupled to the primary winding in series. Switch Q1 is configured to be turned ON/OFF by a control signal Ctrl to transfer power from a primary side to a secondary side, wherein control signal Ctrl is provided by a control circuit 150. In one embodiment, turns ratio between the primary winding and a secondary winding of transformer T1 is about N: 1, where N is a natural number. A feedback signal VFB is provided to indicate a current flowing through a LED/LED string. In one embodiment, a resistor Rs coupled to the LED/LED string in series is employed to detect the current flowing through the LED/LED string and to provide feedback signal VFB. An inverting terminal of an error amplifier 156 is configured to receive feedback signal VFB, and a non-inverting terminal of error amplifier 156 is configured to receive a dimming signal VDIM, and an output terminal of error amplifier 156 is configured to provide a compensation signal VCOMP at a COMP pin. An external capacitor C4 is coupled between COMP pin and ground. A multiplier 151 comprising a first input terminal, a second input terminal and an output terminal is employed, wherein the first input terminal is coupled to the output terminal of error amplifier 156 to receive compensation signal VCOMP, the second input terminal is configured to receive a feedback input signal Vin_rec, and the output terminal is configured to provide a signal Vmul indicating a product of compensation signal VCOMP and feedback input signal Vin_rec. In one embodiment, a voltage divider 130 is configured to receive rectified input signal Vdc and provide feedback input signal Vin_rec accordingly. In one embodiment, feedback input signal Vin_rec is a rectified sin-wave and signal Vmul is also a rectified sin-wave. When switch Q1 is turned ON, a current flowing through switch Q1 increases linearly per switching frequency of switch Q1 is much larger than frequency of input signal Vac. A resistor RCS is coupled to switch Q1 in series to provide a sensed current signal ICS indicating the current flowing through switch Q1. In one embodiment, a leading edge blanking circuit (LEB) 157 is employed and the current flowing through switch Q1 is sensed after a leading edge blanking time period is expired. A comparator 153 comprising an inverting terminal, a non-inverting terminal and an output terminal is employed, wherein the inverting terminal is coupled to the output terminal of multiplier 151 to receive signal Vmul, and the non-inverting terminal is configured to receive sensed current signal ICS. A flip-flop 152 comprising a set terminal S, a reset terminal R, a non-inverting output Q, and an inverting output/Q is employed, wherein reset terminal R is coupled to the output terminal of comparator 153, and non-inverting output Q is configured to provide control signal Ctrl to a control terminal of switch Q1. In one embodiment, when sensed current signal ICS is larger than signal Vmul, flip-flop 152 is reset by comparator 153 to turn OFF switch Q1.

Switch Q1 is configured to have a minimum-on time period, and the minimum-on time period may equal to the leading edge blanking time period. When switching Q1 is turned OFF, a current flowing through diode D2 decreases linearly. When the current flowing through diode D2 reduces to zero, resonance may occur at the primary side. In one embodiment, a zero-crossing detector (ZCD) 160 is employed to detect voltage across an auxiliary winding W3 via a voltage divider 140 and to provide a zero-crossing signal ZC. Switch Q1 is turned ON when effective zero-crossing signal ZC is detected.

As shown in FIG. 1, a restart timer 158 is employed for restarting the system before effective zero-crossing signal ZC is detected. A minimum-off time control circuit 159 is employed to control a minimum-off time period and to limit a maximum switching frequency of switch Q1. During the minimum-off time period, minimum-off time control circuit 159 is configured to provide an ineffective minimum-off time control signal VB to shield zero-crossing signal ZC. Otherwise, when the minimum-off time period is expired, minimum-off time control circuit 159 is configured to provide effective minimum-off time control signal VB, and then zero-crossing signal ZC is delivered to set terminal S of flip-flop 152 via an AND gate 161 and an OR gate 155. In one embodiment, when the minimum-off time period is expired and zero-crossing signal ZC is effective, flip-flop 152 is configured to provide effective control signal Ctrl to turn ON switch Q1. In one embodiment, flip-flop 152 is configured to provide control signal Ctrl to switch Q1 through a driver 154 and a resistor R4.

Figure 5A:
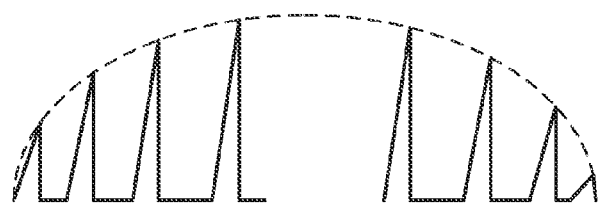
FIG. 5A shows switching waveform of a switch-mode power supply shown in FIG. 1 at normal condition in accordance with an embodiment of the present invention.
Figure 5B:
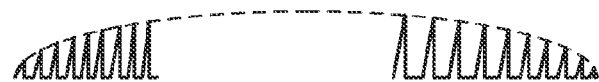
FIG. 5B shows switching waveform of a switch-mode power supply shown in FIG. 1 with a low compensation signal in accordance with an embodiment of the present invention.

In the example of FIG. 1, when dimming signal VDIM decreases, compensation signal VCOMP becomes lower. But because of the minimum-on time period, there is a minimum current flowing through the LED/LED string especially when amplitude of input signal Vac is high. FIG. 5A and FIG. 5B shows switching waveform of switch-mode power supply 100 shown in FIG. 1 with constant minimum-off time period. FIG. 5A shows switching waveform at normal condition and FIG. 5B shows switching waveform with low compensation signal VCOMP. As shown in FIG. 5B, an off-time period of switch Q1 decreases with compensation signal VCOMP. But because of the minimum-on time period, the current flowing through the LED/LED string can not go to much lower even with lower compensation signal VCOMP, and accurate current regulation for uniform illumination can not be obtained.

Figure 2:
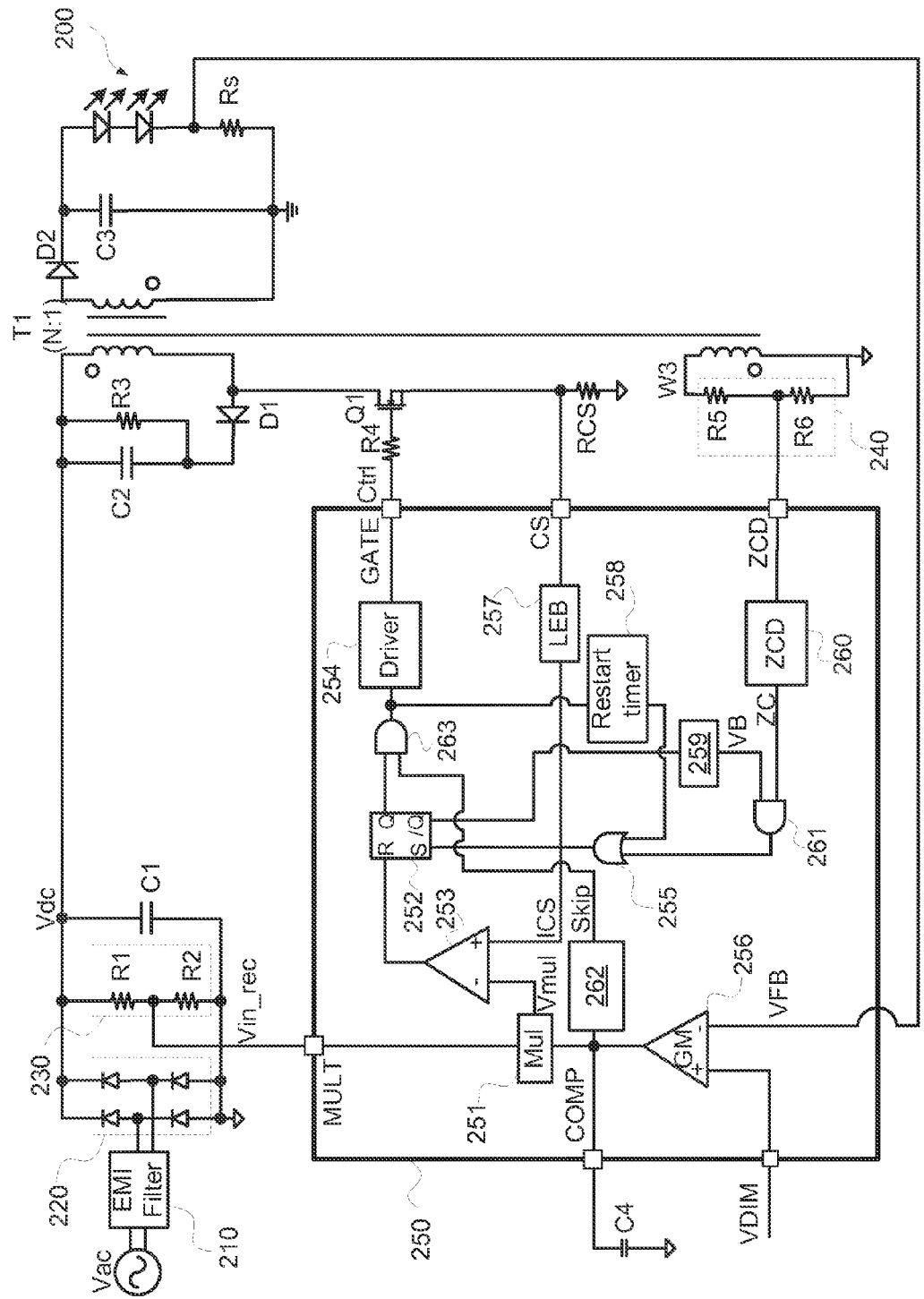
FIG. 2 illustrates a block diagram of a switch-mode power supply with a burst mode control circuit in accordance with an embodiment of the present invention.

FIG. 2 shows a block diagram of a LED driving circuit 200 in accordance with another embodiment of the present invention. In one embodiment shown in FIG. 2, when compensation signal VCOMP is low, circuit 200 enters into burst mode, i.e., pulse skipping mode.

As shown in FIG. 2, input signal Vac is coupled to a bridge rectifier 220 via an EMI filter 210, and a rectified input signal Vdc is coupled to the primary winding of transformer T1. Switch Q1 is coupled to the primary winding in series. Switch Q1 is configured to be turned ON/OFF by control signal Ctrl to transfer power from the primary side to the secondary side, wherein control signal Ctrl is provided by a control circuit 250. In one embodiment, turns ratio between the primary winding and the secondary winding is about N: 1, where N is a natural number. Resistor Rs is employed to provide feedback signal VFB to detect the current flowing through the LED/LED string. An error amplifier 256 is configured to amplify an error between feedback signal VFB and dimming signal VDIM, and to provide compensation signal VCOMP at COMP pin. One terminal of capacitor C4 is coupled to COMP pin. A multiplier 251 comprises a first input terminal, a second input terminal and an output terminal, wherein the first input terminal is coupled to the output terminal of error amplifier 256 to receive compensation signal VCOMP, the second input terminal is configured to receive feedback input signal Vin_rec, and the output terminal is configured to provide signal Vmul indicating product of compensation signal VCOMP and feedback input signal Vin_rec. In one embodiment, a voltage divider 230 is configured to receive rectified input signal Vdc and provide feedback input signal Vin_rec accordingly. When switch Q1 is turned ON, the current flowing through switch Q1 increases linearly per switching frequency of switch Q1 is much larger than frequency of input signal Vac. Resistor RCS is employed to provide sensed current signal ICS indicating the current flowing through switch Q1. In one embodiment, a leading edge blanking circuit (LEB) 257 is employed and the current flowing through switch Q1 is sensed after a leading edge blanking time period is expired. A comparator 253 comprises an inverting terminal, a non-inverting terminal and an output terminal, wherein the inverting terminal is coupled to the output terminal of multiplier 251 to receive signal Vmul, and the non-inverting terminal is configured to receive sensed current signal ICS. A flip-flop 252 comprises a set terminal S, a reset terminal R, a non-inverting output Q, and an inverting output/Q, wherein reset terminal R is coupled to the output terminal of comparator 253, and non-inverting output is configured to provide control signal Ctrl to the control terminal of switch Q1, In one embodiment, when sensed current signal ICS is larger than signal Vmul, flip-flop 252 is reset by comparator 253 to turn OFF switch Q1.

Switch Q1 is configured to have a minimum-on time period which may equal to the leading edge blanking time period. When switch Q1 is turned OFF, the current flowing through diode D2 decreases linearly. When the current flowing through diode D2 reduces to zero, resonance may occur at the primary side. In one embodiment, a zero-crossing detector (ZCD) 260 is employed to detect voltage across auxiliary winding W3 via a voltage divider 240 and to provide zero-crossing signal ZC. Switch Q1 is turned ON when effective zero-crossing signal ZC is detected.

As shown in FIG. 2, a restart timer 258 is employed for restarting the system before effective zero-crossing signal ZC is detected. A minimum-off time control circuit 259 is employed to control the minimum-off time period and to limit the maximum switching frequency of switch Q1. During the minimum-off time period, minimum-off time control circuit 259 is configured to provide ineffective minimum-off time control signal VB to shield zero-crossing signal ZC. Otherwise, when the minimum-off time period is expired, minimum-off time control circuit 259 is configured to provide effective minimum-off time control signal VB, and then zero-crossing signal ZC is delivered to set terminal S of flip-flop 252 via an AND gate 261 and an OR gate 255. In one embodiment, when the minimum-off time period is expired and zero-crossing signal ZC is effective, flip-flop 252 is set to provide an effective signal at its non-inverting output Q. When pulse skipping signal Skip provided by a burst mode control circuit 262 is effective, flip-flop 252 is configured to provide control signal Ctrl to switch Q1 through an AND gate 263, a driver 254 and resistor R4.

In the example of FIG. 2, when compensation signal VCOMP is low, switch-mode power supply 200 enters into burst mode operation, and some sequential switching periods are skipped. As a result, accurate current regulation for uniform illumination can be obtained even when compensation signal VCOMP is low. Burst mode control circuit 262 is configured to provide pulse skipping signal Skip based on compensation signal VCOMP. When compensation signal VCOMP decreases, more switching periods are skipped by burst mode control circuit 262 via an AND gate 263, and as a result, the current flowing through the LED/LED string becomes lower.

But at burst mode operation, average current flowing through the LED/LED string is not a sine-wave per skipped switching periods, and as a result, high power factor can not be obtained. Besides, at burst mode operation, the total harmonic distortion (THD) is higher, and the LED/LED string may flicker.

In one embodiment, the minimum-off time period of switch Q1 is inversely adjusted with compensation signal VCOMP when dimming signal VDIM is low. The minimum-off time period is almost constant during one period of input signal Vac, so both high power factor and accurate current regulation for uniform illumination can be obtained even when compensation signal VCOMP is low. Besides, when compensation signal VCOMP becomes lower, switching frequency decreases, and as a result, switching loss decreases.

Figure 3:
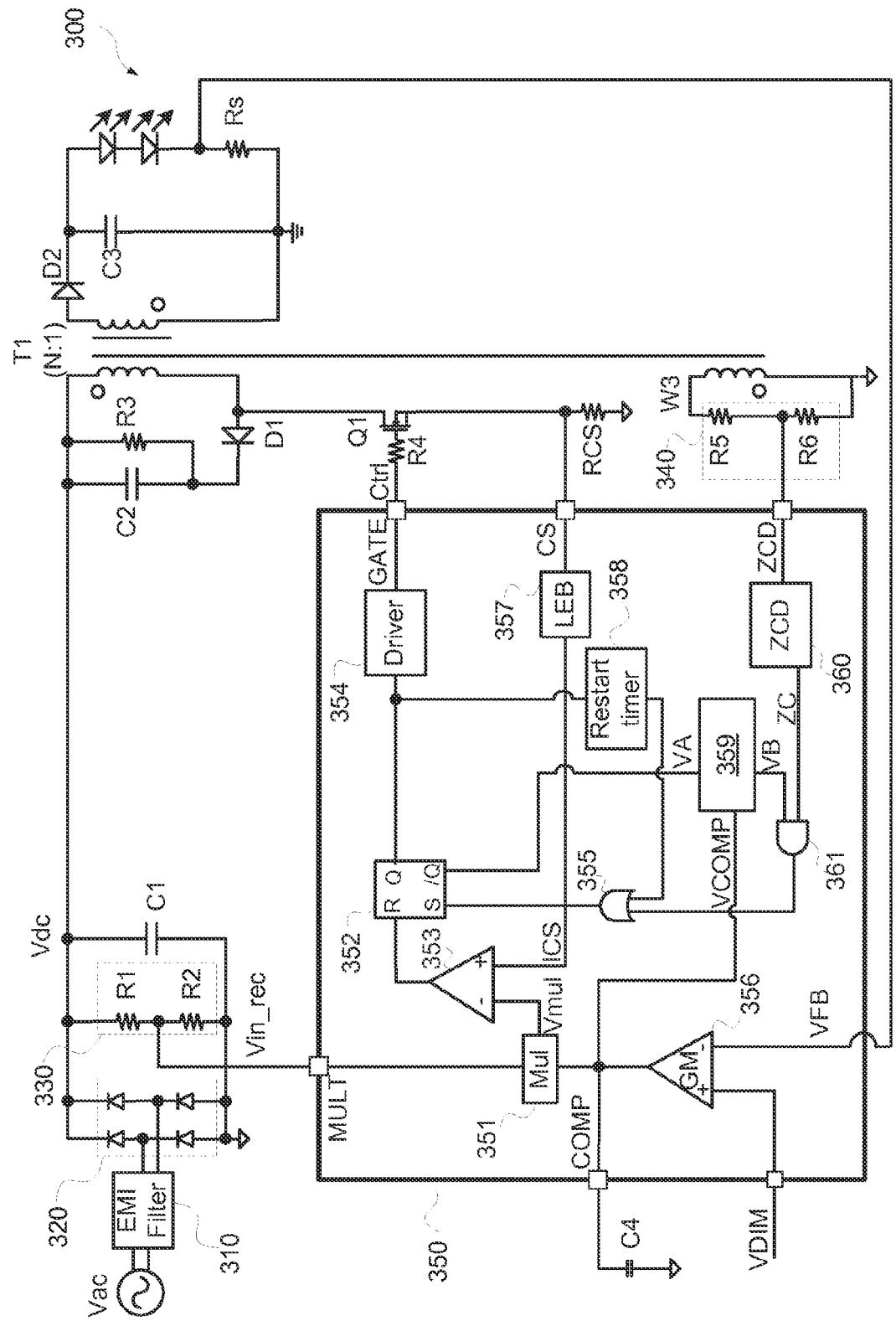
FIG. 3 illustrates a block diagram of a switch-mode power supply in accordance with another embodiment of the present invention.

FIG. 3 illustrates a block diagram of a switch-mode power supply 300 in accordance with another embodiment of the present invention. In one embodiment shown in FIG. 3, the minimum-off time period of switch Q1 is extended when compensation signal VCOMP becomes lower, and both high power factor and accurate current regulation for uniform illumination can be achieved.

As shown in FIG. 3, input signal Vac is coupled to a bridge rectifier 320 via an EMI filter 310 and rectified input signal Vdc is coupled to the primary winding of transformer T1. Switch Q1 is coupled to the primary winding in series. Switch Q1 is configured to be turned ON/OFF by control signal Ctrl to transfer power from the primary side to the secondary side, wherein control signal Ctrl is provided by a control circuit 350. In one embodiment, turns ratio between the primary winding and the secondary winding of transformer T1 is about N: 1, where N is a natural number. Resistor Rs is employed to provide feedback signal VFB to detect the current flowing through the LED/LED string. An error amplifier 356 is configured to amplify an error between feedback signal VFB and dimming signal VDIM, and is configured to provide compensation signal VCOMP at COMP pin. One terminal of capacitor C4 is coupled to COMP pin. A multiplier 351 is configured to receive compensation signal VCOMP and feedback input signal Vin_rec which is a rectified sin-wave, and is configured to provide signal Vmul indicating the product of compensation signal VCOMP and feedback input signal Vin_rec. In one embodiment, a voltage divider 330 is configured to receive rectified input signal Vdc and provide feedback input signal Vin_rec. When switch Q1 is turned ON, the current flowing through switch Q1 increases linearly per switching frequency of switch Q1 is much larger than frequency of input signal Vac. Resistor RCS is employed to provide sensed current signal ICS indicating the current flowing through switch Q1. In one embodiment, a leading edge blanking circuit (LEB) 357 is employed and the current flowing through switch Q1 is sensed after a leading edge banking time period is expired. When sensed current signal ICS is larger than signal Vmul, a comparator 353 is configured to provide an effective signal to a reset terminal R of a flip-flop 352, and flip-flop 352 is configured to provide an ineffective control signal Ctrl at a non-inverting output Q to turn OFF switch Q1.

Switch Q1 is configured to have a minimum-on time period which may equal to the leading edge blanking time period. When switch Q1 is turned OFF, the current flowing through diode D2 decreases linearly. When the current flowing through diode D2 reduces to zero, resonance may occur at the primary side. In one embodiment, a zero-crossing detector (ZCD) 360 is employed to detect voltage across auxiliary winding W3 via a voltage divider 340 and to provide zero-crossing signal ZC. Switch Q1 is turned ON when effective zero-crossing signal ZC is detected.

As shown in FIG. 3, a restart timer 358 is employed for restarting the system before effective zero-crossing signal ZC is detected. A minimum-off time control circuit 359 is employed to control the minimum-off time period and to limit the maximum switching frequency of switch Q1. During the minimum-off time period, minimum-off time control circuit 359 is configured to provide ineffective minimum-off time control signal VB to shield zero-crossing signal ZC. Otherwise, when the minimum-off time period is expired, minimum-off time control circuit 359 is configured to provide effective minimum-off time control signal VB, and then zero-crossing signal ZC is delivered to set terminal S of flip-flop 352 via an AND gate 361 and an OR gate 355. In one embodiment, when the minimum-off time period is expired and zero-crossing signal ZC is effective, flip-flop 352 is configured to provide effective control signal Ctrl to turn ON switch Q1. In one embodiment, flip-flop 352 is configured to provide control signal Ctrl to switch Q1 through a driver 354 and resistor R4

Minimum-off time control circuit 359 is configured to adjust the minimum-off time period based on a signal VA and compensation signal VCOMP, wherein signal VA is provided by flip-flop 352 at its inverting output/Q. The minimum-off time period is varied with compensation signal VCOMP. In one embodiment, the minimum-off time period is extended when compensation signal VCOMP becomes lower, and the minimum-off time period is shortened when compensation signal VCOMP becomes higher. In one embodiment, the minimum-off time period is varied inversely with compensation signal VCOMP when compensation signal VCOMP is less than a threshold signal Vth1.

As a result, the minimum-off time period is extended when compensation signal VCOMP becomes lower, and both high power factor and accurate current regulation for uniform illumination can be achieved.

Figure 4:
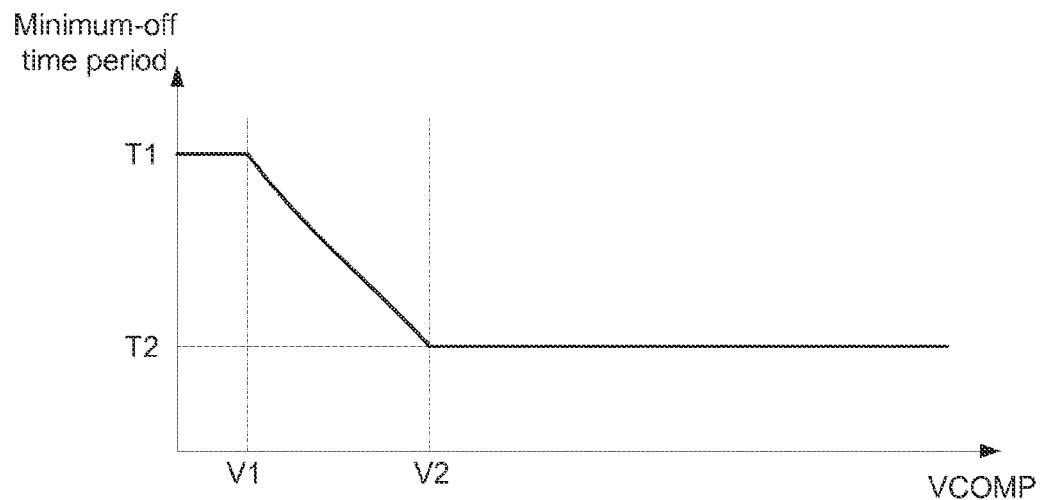
FIG. 4 illustrates a diagrammatic curve for dimming in accordance with an embodiment of the present invention.

FIG. 4 illustrates a diagrammatic curve for dimming in accordance with an embodiment of the present invention. As shown in FIG. 4, when compensation signal VCOMP changes from V1 to V2, the minimum-off time period will shorten from T1 to T2, where T1 is larger than T2 and V1 is less than V2. In the same way, when compensation signal VCOMP changes from V2 to V1, the minimum-off time period will extend from T2 to T1

Figure 6A:
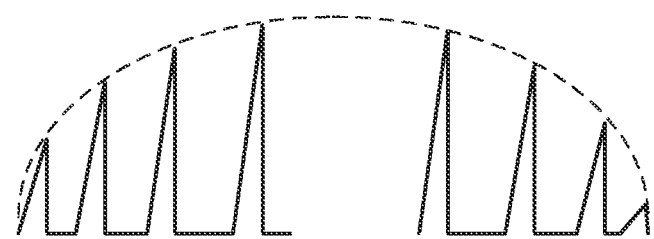
FIG. 6A shows switching waveform of a switch-mode power supply shown in FIG. 3 at normal condition during half period of an input signal in accordance with an embodiment of the present invention.
Figure 6B:
FIG. 6B shows switching waveform of a switch-mode power supply shown in FIG. 3 with a low compensation signal during half period of an input signal in accordance with an embodiment of the present invention.

FIG. 6A shows switching waveform of switch-mode power supply 300 shown in FIG. 3 at normal condition during half period of input signal Vac in accordance with an embodiment of the present invention. FIG. 6B shows switching waveform of switch-mode power supply 300 shown in FIG. 3 with very low compensation signal VCOMP during half period of input signal Vac in accordance with an embodiment of the present invention.

As shown in FIG. 6A, compensation signal VCOMP is high and the minimum-off time period keeps constant at normal condition. As shown in FIG. 6B, when compensation signal VCOMP becomes very low, the minimum-off time period is extended, the off-time period of switch Q1 would be extended per the off-time period of switch Q1 should be longer than the minimum-off time period, the current flowing through the LED/LED string can be lower, and accurate current regulation for uniform illumination can be achieved. Besides, because an extension of minimum-off time period, there is no need to skip any switching period to achieve accurate current regulation for LED/LED string, so high power factor can be got even in low brightness condition.

Figure 7:
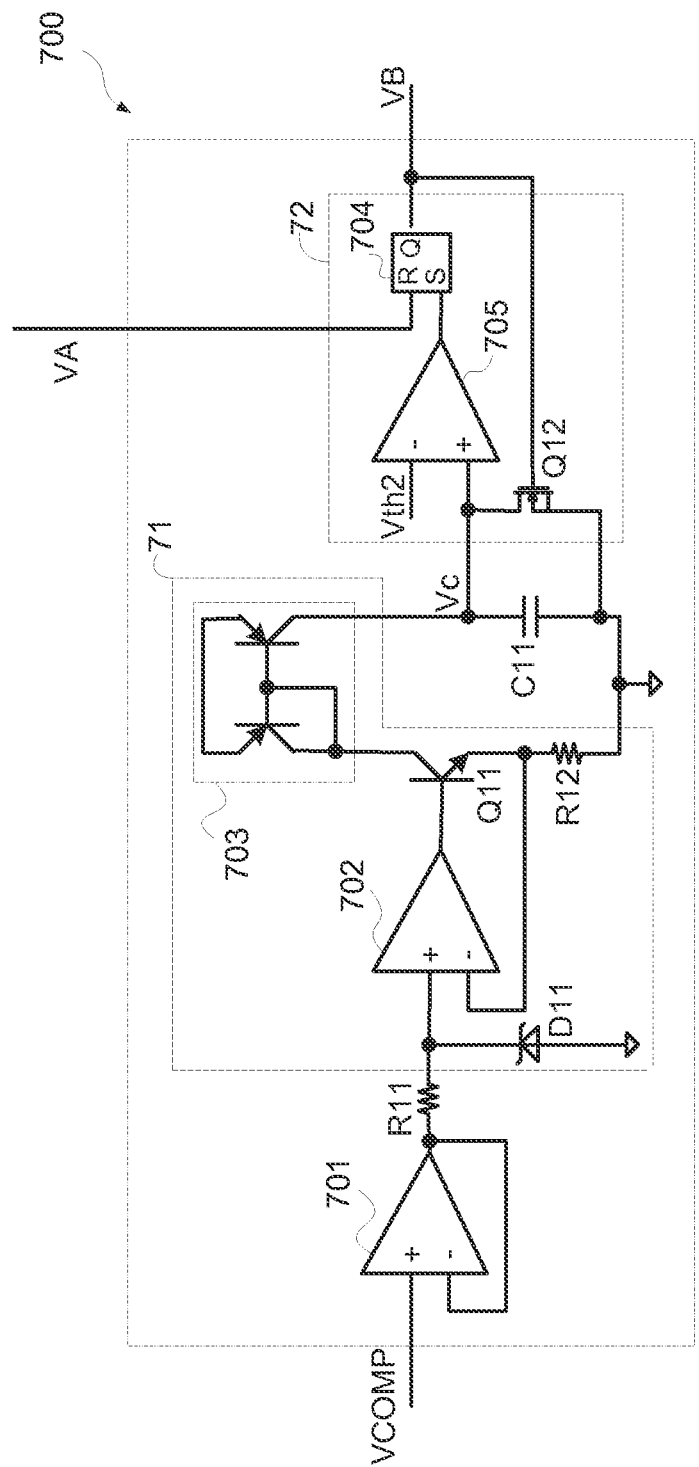
FIG. 7 schematically illustrates a minimum-off time circuit in accordance with an embodiment of the present invention.

FIG. 7 schematically illustrates a minimum-off time control circuit 700 in accordance with an embodiment of the present invention. In one embodiment, minimum-off time control circuit 700 comprises a capacitor C11, a charging circuit 71 and a discharging circuit 72, wherein charging circuit 71 comprises an amplifier 702, a transistor Q11, and a current mirror 703, discharging circuit 72 comprises a discharging switch Q12, a flip-flop 704 and a comparator 705. As shown in FIG. 7, an amplifier 701 comprising a non-inverting terminal, an inverting terminal and an output terminal is employed as a follower, wherein the non-inverting terminal is configured to receive compensation signal VCOMP, and the inverting terminal is coupled to the output terminal of amplifier 701. Amplifier 702 comprises a non-inverting terminal, an inverting terminal and an output terminal, wherein the non-inverting terminal is coupled to the output terminal of amplifier 701 through a resistor R11, the inverting terminal is coupled to an Emitter of a transistor Q11, and the output terminal is coupled to a Base of transistor Q11. Emitter of transistor Q11 is coupled to ground through a resistor R12. In one embodiment, resistor R12 is employed to control charging rate of capacitor C11. In one embodiment, a Zener diode D11 is coupled to the non-inverting terminal of amplifier 702 to clamp output of amplifier 701. As a result, minimum-off time control circuit 700 is configured to adjust the minimum-off time period when compensation signal VCOMP is low. When compensation signal VCOMP is high, output of amplifier 701 is clamped at threshold signal Vth1 by Zener diode D11 and the minimum-off time period will keep constant.

Current mirror 703 comprises an input terminal and an output terminal, wherein the input terminal is coupled to a Collector of transistor Q11. Comparator 705 comprises a non-inverting terminal, an inverting terminal and an output terminal, wherein the non-inverting terminal is coupled to the output terminal of current mirror 703, and the inverting terminal is configured to receive a threshold signal Vth2. In one embodiment, the non-inverting terminal of comparator 705 is coupled to ground through capacitor C11. Flip-flop 704 comprises a set terminal S, a reset terminal R, and an output terminal Q, wherein set terminal S is coupled to the output terminal of comparator 705, reset terminal R is configured to receive signal VA, and output terminal Q is configured to provide minimum-off time control signal VB. As shown in FIG. 7, Capacitor C11 is charged by current mirror 703, and when capacitor voltage Vc is larger than threshold signal Vth2, comparator 705 is configured to provide an effective signal, and flip-flop 704 is set to provide effective minimum-off time control signal VB. A Drain of discharging switch Q12 is coupled to the non-inverting terminal of comparator 705, a Source of discharging switch Q12 is coupled to ground, and a Gate of discharging switch Q12 is coupled to output terminal Q of flip-flop 704 to receive minimum-off time control signal VB. When minimum-off time control signal VB is effective (e.g., logic HIGH), capacitor C11 is discharged via discharging switch Q12. As shown in FIG. 3, signal VA and control signal Ctrl are out of phase, and current mirror 703 is configured to charge capacitor C11 again after control signal Ctrl is effective. When capacitor voltage Vc is less than threshold signal Vth2, minimum-off time control signal VB is ineffective, and zero-crossing signal ZC is shielded by AND gate 361 shown in FIG. 3. The minimum-off time period equals to a time period that capacitor voltage Vc increases from zero to threshold signal Vth2.

Figure 8A:
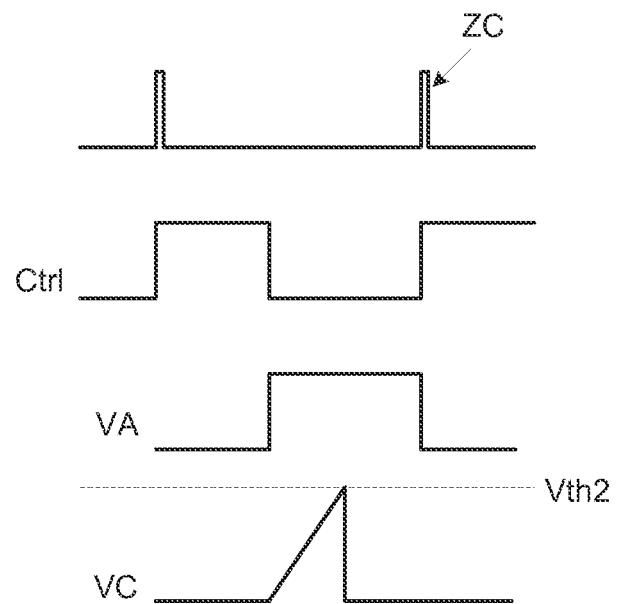
FIG. 8A shows waveforms illustrating signals of a switch-mode power supply at normal condition in accordance with an embodiment of the present invention.

As described above, when compensation signal VCOMP is large, output of amplifier 701 is clamped by Zener diode D11 at threshold signal Vth1, and the minimum-off time period keeps constant even when compensation signal Vcomp changes. In the example shown in FIG. 8A, when control signal Ctrl becomes LOW, capacitor C11 is charged by current mirror 703. Since voltage at the inverting terminal of amplifier 702 is clamped by Zener diode D11, capacitor C11 is quickly charged, and capacitor voltage Vc may increase to threshold signal Vth2 before effective zero-crossing signal ZC is detected. And when effective zero-crossing signal ZC is detected, flip-flop 352 is set to turn ON switch Q1

Figure 8B:
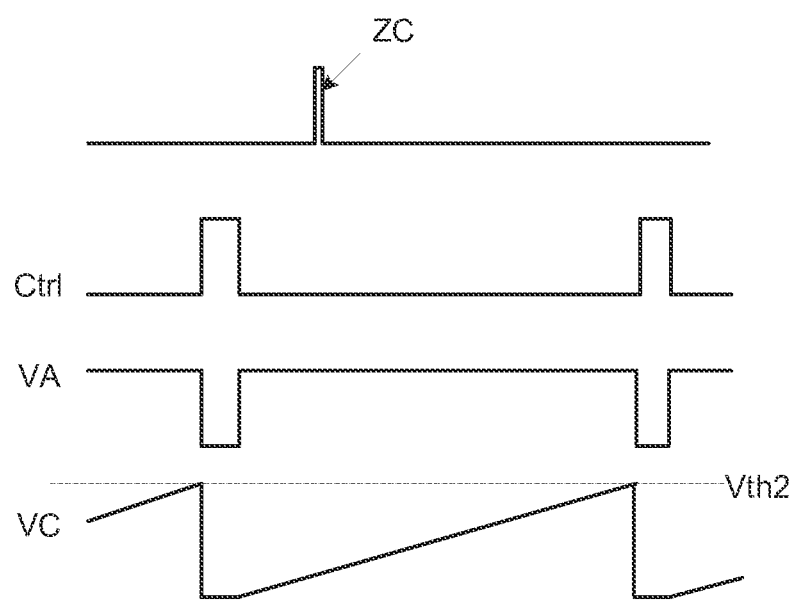
FIG. 8B shows waveforms illustrating signals of a switch-mode power supply with a low compensation signal in accordance with an embodiment of the present invention.

The minimum-off time period is adjusted inversely with compensation signal VCOMP when compensation signal VCOMP is low. In one embodiment, the minimum-off time period is extended when compensation signal VCOMP decreases, and the minimum-off time period is shortened when compensation signal VCOMP increases. In the example shown in FIG. 8B, the minimum-off time period is extended per very low compensation signal VCOMP, capacitor voltage Vc increases to threshold signal Vth2 after effective zero-crossing signal ZC has been detected, and then flip-flop 352 is set to turn ON switch Q1.

In one embodiment, the minimum-off time period is adjusted when dimming signal VDIM is less than a threshold, and the threshold may be related with breakdown voltage of Zener diode D11.

Discrete components are described above as one example to illustrate the structure and function of minimum-off time control circuit 700. However, one with ordinary skill in the relevant art should understand that minimum-off time control circuit 700 may comprise several functional circuits, e.g., a charging control circuit, a discharging circuit and so on. In one embodiment, the charging control circuit may comprise amplifier 702, resistor R12 and transistor Q11. The charging control circuit is employed to charge capacitor C11. The non-inverting terminal of amplifier 702 is configured to receive clamped compensation signal Vcomp, the output terminal of amplifier 702 is coupled to Base of transistor Q11, and the inverting terminal of amplifier 702 is coupled to Collector of transistor Q11, wherein Collector of transistor Q11 is coupled to ground via resistor R12.

In one embodiment, the discharging circuit may comprise discharging switch Q12, amplifier705 and flip-flop 704, and the discharging circuit is employed to discharge capacitor C11. In one embodiment, the non-inverting terminal of comparator 705 is coupled to capacitor C11 to receive capacitor voltage Vc, the inverting terminal of comparator 705 is configured to receive threshold signal Vth2, and the output terminal of comparator 705 is coupled to set terminal S of flip-flop 704. Capacitor C11 is discharged by discharging switch Q12 when minimum-off time control signal VB is effective.

In one embodiment, current mirror 703 is employed to charge capacitor C11. In other embodiments, transistor Q11 or any other suitable type of current source may be used to charge capacitor C11.

One with ordinary skill in the relevant art should known that the topology of the switch-mode power supply is not limited to flyback converter comprising power factor correction, any other suitable AC/DC or DC/DC topology may be employed. And any suitable control method may be employed, e.g., PWM control, off-time control, and constant-on time control.

Figure 9:
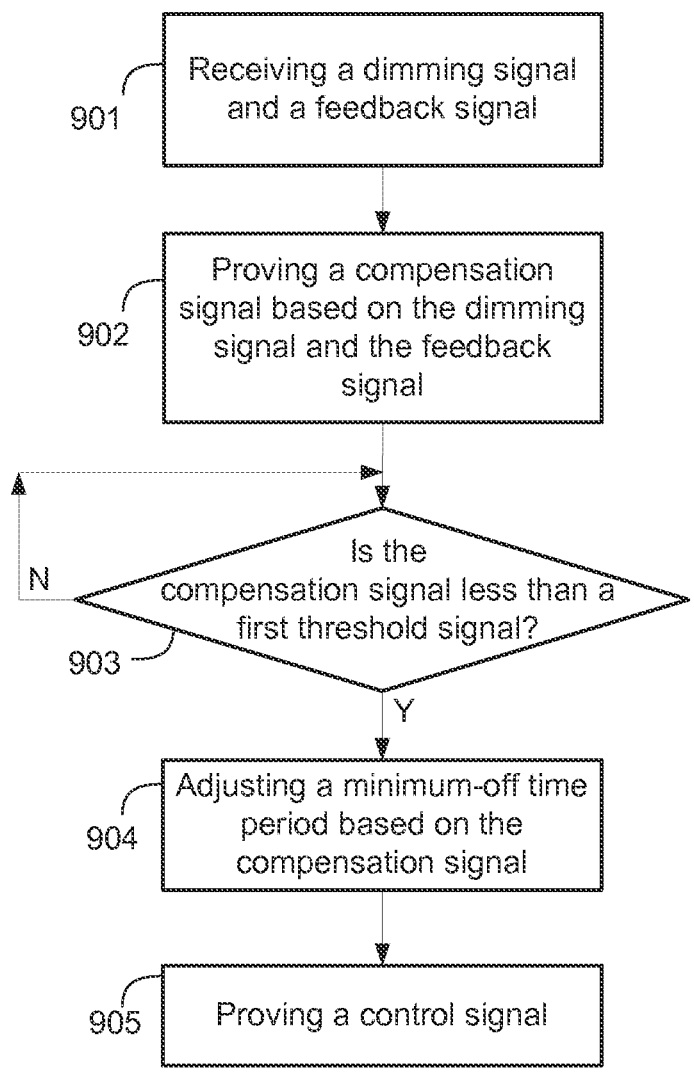
FIG. 9 shows a flow chart illustrating a dimming control method in accordance with an embodiment of the present invention.

FIG. 9 shows a flow chart illustrating a dimming control method for a switch-mode power supply in accordance with an embodiment of the present invention. In one embodiment, the switch-mode power supply comprises a first switch. The first switch is turned ON or OFF by a control signal and power is provided to a light-emitting device.

As shown in FIG. 9, the dimming control method comprises steps 901-905.

At step 901, receiving a diming signal and a feedback signal, wherein the feedback signal is configured to indicate a current flowing through the light-emitting device.

At step 902, providing a compensation signal based on the dimming signal and the feedback signal.

At step 903, if the compensation signal is less than a first threshold signal, then goes to step 904. At step 904, adjusting a minimum-off time period of the first switch based on the compensation signal and providing a minimum-off time control signal.

At step 905, providing the control signal based on the minimum-off time control signal.

In one embodiment, adjusting the minimum-off time period comprises: charging a capacitor, wherein charging rate of the capacitor is based on the compensation signal; discharging the capacitor when a capacitor voltage increases larger than a second threshold signal; and wherein the minimum-off time period is provided before the capacitor voltage equals to the second threshold signal.

In one embodiment, when the compensation signal is less than the first threshold signal, the minimum-off time period is adjusted inversely with the compensation signal.

The above description and discussion about specific embodiments of the present technology is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

I claim:

1. A control circuit for a switch-mode power supply, the switch-mode power supply having an input terminal configured to receive an input signal and an output terminal configured to provide an output signal to a light-emitting device, wherein the switch-mode power supply comprising a first switch, the first switch is turned ON or OFF by a control signal, and wherein the control circuit comprising:
   an error amplifier, having a first input terminal, a second input terminal and an output terminal, wherein the first input terminal is configured to receive a dimming signal, the second input terminal is configured to receive a feedback signal, and the output terminal is configured to provide a compensation signal, and wherein the feedback signal is based on a current flowing through the light-emitting device;
   a minimum-off time control circuit, having an input terminal and an output terminal, wherein the input terminal is coupled to the output terminal of the error amplifier to receive the compensation signal, and the output terminal is configured to provide a minimum-off time control signal to adjust a minimum-off time period of the first switch based on the compensation signal; and
   a logic circuit, configured to provide the control signal based on the minimum-off time control signal.

2. The control circuit of claim 1, wherein the minimum-off time period is adjusted inversely with the compensation signal when the compensation signal is less than a first threshold signal.

3. The control circuit of claim 1, wherein the minimum-off time control circuit further comprises:
   a capacitor, having a first terminal and a second terminal;
   a charging circuit, having a first terminal and a second terminal, wherein the first terminal is configured to receive the compensation signal, and the second terminal is coupled to the first terminal of the capacitor to charge the capacitor, and wherein a charging rate of the capacitor is based on the compensation signal; and
   a discharging circuit, having a first terminal and a second terminal, wherein the first terminal is coupled to the first terminal of the capacitor and the second terminal is coupled to the second terminal of the capacitor, and wherein the discharging circuit is configured to discharge the capacitor when a capacitor voltage is larger than a second threshold signal; and wherein
   the minimum-off time period is based on a time period during which the capacitor voltage increases from zero voltage to the second threshold signal.

4. The control circuit of claim 3, wherein the charging circuit further comprises a clamping circuit, the clamping circuit is configured to provide a clamped signal, wherein the clamped signal equals to a first threshold signal when the compensation signal is larger than the first threshold signal, and the clamped signal equals to the compensation signal when the compensation signal is less than the first threshold signal.

5. The control circuit of claim 4, wherein the charging circuit further comprises:
- a first amplifier, having a non-inverting terminal, an inverting terminal and an output terminal, wherein the non-inverting terminal is configured to receive the clamped signal;
- a first transistor, having a Base, an Emitter and a Collector, wherein the Base is coupled to the output terminal of the first amplifier, and the Collector is coupled to the inverting terminal of the first amplifier;
- a resistor, having a first terminal and a second terminal, wherein the first terminal is coupled to the Collector of the first transistor, and the second terminal is coupled to a ground; and
- a current source, having an input terminal and an output terminal, wherein the input terminal is coupled to the Emitter of the first transistor, and the output terminal is coupled to the first terminal of the capacitor.

6. The control circuit of claim 3, wherein the charging circuit further comprising a current mirror, the current mirror is configured to provide a charging current to the capacitor based on the compensation signal.

7. The control circuit of claim 3, wherein the discharging circuit further comprising:
- a first comparator, having a non-inverting terminal, an inverting terminal and an output terminal, wherein the non-inverting terminal is coupled to the first terminal of the capacitor to receive the capacitor voltage, and the inverting terminal is configured to receive the second threshold signal;
- a first flip-flop, having a set terminal, a reset terminal and an output terminal, wherein the set terminal is coupled to the output terminal of the first comparator, and the output terminal is configured to provide the minimum-off time control signal; and
- a discharging switch, configured to discharge the capacitor when the minimum-off time control signal is effective.

8. The control circuit of claim 1, wherein the minimum-off time control circuit further comprising a capacitor, wherein the capacitor is charged after the control signal transits to ineffective, and a charging rate of the capacitor is based on the compensation signal, and wherein the capacitor is discharged when a capacitor voltage is larger than a second threshold signal.

9. The control circuit of claim 8, wherein the minimum-time period is based on a time period during which the capacitor voltage increases from zero voltage to the second threshold signal.

10. The control circuit of claim 8, wherein the minimum-off time control circuit further comprising:
- a second amplifier, having a non-inverting terminal, an inverting terminal and an output terminal, wherein the non-inverting terminal is configured to receive the compensation signal, and the inverting terminal is coupled to the output terminal;
- a Zener diode, having an anode and a cathode, wherein the anode is coupled to a ground, and the cathode is coupled to the output terminal of the second amplifier;
- a first amplifier, having a non-inverting terminal, an inverting terminal and an output terminal, wherein the non-inverting terminal is coupled to the output terminal of the second amplifier;
- a first transistor, having a Base, an Emitter and a Collector, wherein the Base is coupled to the output terminal of the first amplifier, and the Collector is coupled to the inverting terminal of the first amplifier; and
- a current mirror, having an input terminal and an output terminal, wherein the input terminal is coupled to the Emitter of the first transistor, and the output terminal is coupled to the capacitor to provide a charging current.

11. The control circuit of claim 8, wherein the minimum-off time control circuit further comprising:
- a first comparator, having a non-inverting terminal, an inverting terminal and an output terminal, wherein the non-inverting terminal is configured to receive the capacitor voltage, and the inverting terminal is configured to receive the second threshold signal;
- a first flip-flop, having a set terminal, a reset terminal and an output terminal, wherein the set terminal is coupled to the output terminal of the first comparator, and the output terminal is configured to provide the minimum-off time control signal; and
- a discharging switch, configured to discharge the capacitor when the minimum-off time control signal is effective.

12. The control circuit of claim 1, wherein the control circuit further comprising:
- a multiplier, comprising a first input terminal, a second input terminal and an output terminal, wherein the first input terminal is coupled to the output terminal of the error amplifier to receive the compensation signal, and the second input terminal is configured to receive a feedback input signal, and wherein the feedback input signal is based on the input signal; and
- a second comparator, having a non-inverting terminal, an inverting terminal and an output terminal, wherein the non-inverting terminal is configured to receive a sensed current signal, and the inverting terminal is coupled to the output terminal of the multiplier, and wherein the sensed current signal is based on a current flowing through the first switch; and wherein
- the logic circuit is coupled to the output terminal of the second comparator, wherein when the sensed current signal is larger than a product of the compensation signal and the feedback input signal, the logic circuit is configured to provide ineffective control signal to turn OFF the first switch.

13. A diming control method for a switch-mode power supply, the switch-mode power supply having an input terminal configured to receive an input signal and an output terminal configured to provide an output signal to a light-emitting device, wherein the switch-mode power supply comprising a first switch, the first switch is turned ON or OFF by a control signal, and wherein the control method comprising:
- receiving a dimming signal and a feedback signal, wherein the feedback signal is based on a current flowing through the light-emitting device;
- providing a compensation signal based on the dimming signal and the feedback signal;
- adjusting a minimum-off time period of the first switch based on the compensation signal; and
- providing the control signal based on the minimum-off time period.

14. The control method of claim 13, wherein adjusting the minimum-off time period comprising:
- charging a capacitor after the control signal transits to ineffective, wherein a charging rate of the capacitor is based on the compensation signal; and
- discharging the capacitor when a capacitor voltage increases larger than a second threshold signal; and wherein
- the minimum-off time period is based on a time period during which the capacitor voltage increases from zero voltage to the second threshold signal.

15. The control method of claim 13, wherein the minimum-off time period is adjusted inversely with the compensation signal when the compensation signal is less than a first threshold signal.

16. The control method of claim 13, further comprising:
- providing a product signal by multiplying the compensation signal and a feedback input signal, wherein the feedback input signal is based on the input signal;
- receiving a sensed current signal, wherein the sensed current signal is based on a current flowing through the first switch;
- comparing the sensed current signal with the product signal; and
- turning OFF the first switch when the sensed current signal is larger than the product signal.

17. A switch-mode power supply for driving a light-emitting device, wherein the switch-mode power supply having an input terminal configured to receive an input signal and an output terminal configured to provide an output signal to the light-emitting device, and wherein the switch-mode power supply comprising:
- a first switch, having a control terminal configured to receive a control signal, wherein the first switch is turned ON or OFF by the control signal; and
- a control circuit, comprising:
  - an error amplifier, having a first input terminal, a second input terminal and an output terminal, wherein the first input terminal is configured to receive a dimming signal, the second input terminal is configured to receive a feedback signal, and the output terminal is configured to provide a compensation signal, and wherein the feedback signal is based on a current flowing through the light-emitting device;
  - a minimum-off time control circuit, having an input terminal and an output terminal, wherein the input terminal is coupled to the output terminal of the error amplifier to receive the compensation signal, and the output terminal is configured to provide a minimum-off time control signal to adjust a minimum-off time period of the first switch, and wherein the minimum-off time period is adjusted inversely with the compensation signal when the compensation signal is less than a first threshold signal; and
  - a logic circuit, configured to provide the control signal based on the minimum-off time control signal.

18. The switch-mode power supply of claim 17, wherein the minimum-off time control circuit further comprising a capacitor, wherein the capacitor is charged after the first switch is turned OFF, and a charging rate of the capacitor is based on the compensation signal, and wherein the capacitor is discharged when a capacitor voltage is larger than a second threshold signal.

19. The switch-mode power supply of claim 18, wherein the minimum-off time control circuit further comprising:
- a clamping circuit, the clamping circuit is configured to provide a clamped signal, wherein the clamped signal equals to the first threshold signal when the compensation signal is larger than the first threshold signal, and the clamped signal equals to the compensation signal when the compensation signal is less than the first threshold signal;
- a first amplifier, having a non-inverting terminal, an inverting terminal and an output terminal, wherein the non-inverting terminal is configured to receive the clamped signal;
- a first transistor, having a Base, an Emitter and a Collector, wherein the Base is coupled to the output terminal of the first amplifier, and the Collector is coupled to the inverting terminal of the first amplifier; and
- a current source, having an input terminal and an output terminal, wherein the input terminal is coupled to the Emitter of the first transistor, and the output terminal is coupled to the capacitor to provide a charging current.

20. The switch-mode power supply of claim 18, wherein the minimum-off time control circuit further comprising:
- a first comparator, having a non-inverting terminal, an inverting terminal and an output terminal, wherein the non-inverting terminal is coupled to the capacitor to receive the capacitor voltage, the inverting terminal is configured to receive the second threshold signal;
- a first flip-flop, having a set terminal, a reset terminal and an output terminal, wherein the set terminal is coupled to the output terminal of the first comparator, and the output terminal is configured to provide the minimum-off time control signal; and
- a discharging switch, configured to discharge the capacitor when the minimum-off time control signal is effective.

* * * * *